United States Patent [19]

Hayashi

[11] Patent Number: 5,211,448
[45] Date of Patent: May 18, 1993

[54] CENTER LOCK DEVICE FOR AUTOMOBILE WHEELS

[76] Inventor: Masakazu Hayashi, 5-21, 1-chome, Takaidanish, Higashi-Osaka-shi, Osaka-fu, Japan

[21] Appl. No.: 832,344

[22] Filed: Feb. 7, 1992

[51] Int. Cl.⁵ .............................................. B60B 27/06
[52] U.S. Cl. .................................. 301/35.55; 301/9.1; 301/35.63
[58] Field of Search ................... 301/9.1, 35.53, 35.54, 301/35.61, 35.62, 35.63, 35.55, 35.57, 35.58, 35.56

[56] References Cited

U.S. PATENT DOCUMENTS

| | | | |
|---|---|---|---|
| 2,232,859 | 2/1941 | Limprecht | 301/9 CN |
| 4,478,458 | 10/1984 | Flexman | 301/9 DN X |
| 4,537,449 | 8/1985 | Hayashi | 301/9 CN |

FOREIGN PATENT DOCUMENTS

| | | | |
|---|---|---|---|
| 450794 | 8/1948 | Canada | 301/9 CN |
| 1504385 | 10/1967 | France | |
| 46-18642 | 5/1971 | Japan | |
| 53-38701 | 4/1978 | Japan | |
| 59-118502 | 7/1984 | Japan | |
| 59-190001 | 10/1984 | Japan | |
| 1-16641 | 5/1989 | Japan | |
| 413884 | 7/1934 | United Kingdom | 301/9 CN |

Primary Examiner—Russell D. Stormer
Attorney, Agent, or Firm—Armstrong, Westerman, Hattori, McLeland & Naughton

[57] ABSTRACT

The invention provides a center lock device for automobile wheels wherein a center shaft portion integrally projects forwardly from the conical barrel of an adapter in the form of a top type or cylinder hat type, and a center nut is threadedly engaged with a male thread cut in the center shaft portion whereby a wheel disk is removably exchangeably fixed to the hub of an axle. The center lock device being characterized in that in order to attain durability strength, safety and steal prevention in the wheel attached state, the center shaft portion is centrally formed with a female thread for receiving a keep bolt such that the spiral pitch and spiral direction of the female thread differ from those of the female thread, and a keep bolt having a head larger in diameter than the center shaft portion is threadedly engaged with the female thread from the front, so that the center nut is locked against loosening by the large-diametered head of the keep bolt.

6 Claims, 13 Drawing Sheets

CENTER LOCK DEVICE FOR AUTOMOBILE WHEELS

BACKGROUND OF THE INVENTION

Center lock devices for attaching an automobile wheel to an axle hub through a separate adapter in such a manner as to allow it to be removed for exchange and make torque transmission possible, wherein a center nut is threaded on the male thread portion of a center shaft which projects forward from the center of the adapter so as to lock the wheel disk against slip-off, are known as can be seen in French Patent No. 1504385 (corresponding to Japanese Patent Publication No. 18642/1971), Japanese Utility Model Application Laid-Open No. 38701/1978 and Japanese Utility Model Publication No. 16641/1989.

The known techniques mentioned above are basically the same in the arrangement in each of the above references and hence French Patent No. 1504385 mentioned above is taken up as an example for description. An adapter or sleeve 19 is formed with a male thread 21 and a single center nut 26 of the cap type is threadedly engaged directly with said male thread 21. Therefore, the advantage is that by simply turning the single center nut 26, the exchange of wheels can be effected as quickly as in the case of racing cars.

On the other hand, however, since the center nut 26 is a large-sized special part, a great force is required in tightening the male thread 21; it often happens that the resulting tightening is insufficient. Further, since the wheel disk 12 is pressed at the center by only one center nut 26 and thereby fixed in position, if the center nut 26 is repetitively subjected to vibrations or shocks caused by hard brakes or the like during traveling of the automobile, the center nut 26 can easily play or loosen.

Notwithstanding this, there has been no special means added thereto for preventing the loosening of the center nut 26, with the result that there is still some anxiety in the durability and safety of the wheel fixed in position and the stealing of wheels are often encountered.

On the other hand, the present inventor has already proposed U.S. Pat. No. 4,537,449 (corresponding to Japanese Patent Application Laid-Open No. 118502/1984) in order to improve French patent invention mentioned above and Japanese Utility Model Application Laid-Open No. 38701/1978 invented by the present inventor.

The above U.S. patent employs a commonplace bolt B and small-sized center nut N, making it possible to quickly exchange wheels using a relatively small tightening force while preventing the center of a wheel disk D from being visually hidden by the large center nut of the cap type and increasing the degree of freedom in giving various molding patterns for ventilation purposes to said wheel disk D.

However, according to the above-mentioned U.S. Patent, the center bolt B and center nut N are relatively small parts, they are singular, and there is no means specially provided for preventing the loosening of the center nut N; thus, as compared with said French patent invention, it causes the customers to harbor increasing uneasy feelings about the durability and safety of the wheel fixed in position and stealing. This is a serious problem in sales of spare wheels.

As for means for preventing the loosening of the center nut and the stealing of wheels in connection with such center lock device for automobile wheels, Japanese Patent Application Laid-Open No 190001/1984 has been proposed.

It provides a center lock device for automobile wheels, wherein the hub 6 of an axle 4 has joined thereto a seat plate 12 having a thick threaded sleeve 13 and the core hole 16 of a wheel disk 1 is fitted on the plain portion 14 of the threaded sleeve 13, with a cap nut (center nut) N threadedly applied thereto, so that the disk 1 is joined to the axle 4 by the seat plate 12 and cap nut N, The center lock device is characterized in that it comprises an inner tooth ring 17 having teeth 18 cut around the entire periphery of the inner surface, said inner tooth ring being integrally formed on the mouth end of said threaded sleeve 13, a passage hole 22 formed in the end plate 20 of the cap nut N, said passage hole having attached to the inner surface thereof a lock main body 24 having an electronic lock L or cylinder lock built therein, the back surface of said lock main body 24 having a slot 30 in which are installed an intermediary lever 34 having pawls 35 meshing with the teeth 18 of the inner tooth ring 17 and push springs 33 for said pawls 35, a cam 33 for the electronic lock L or cylinder lock received in the middle of said slot 30 and contacted with the intermediary lever 34, said cam 33 serving to advance or retract the pawls 35 to cause the pawl tips to mesh with the inner tooth ring 17or disengage them from the latter.

With this arrangement, however, even if the loosening of the cap nut (center nut) N or the stealing of wheels can be prevented, the number of parts required for this purpose is very large, and the processing and assembling of such parts are very troublesome, such parts being finished as very expensive special parts; thus, such device cannot be easily obtained for use with spare wheels by general users or cannot be used with ease.

SUMMARY OF THE INVENTION

The present invention has been made such that while the merit of the above-described known techniques, that is, the wheel mounting and dismounting exchange operation, is retained, the uneasy feelings about the wheel fixed in position is removed and the stealing of wheels is prevented.

An object of the invention is to provide a center lock device for fixing an automobile wheel to an axle by using a separate adapter and a single center nut adapted to be threadedly engaged with the male thread of a center shaft portion forwardly extending from the center of said adapter, wherein the center shaft portion is centrally formed with a female thread whose spiral pitch and spiral direction differ from those of the male thread and the center nut is prevented from loosening by the large-diametered head of a keep bolt threadedly engaged with the female thread from the front, so as to increase the durability and safety of the wheel fixed in position.

The head of the keep bolt is made greater in diameter than the center shaft portion of the adapter so that the large-diametered head presses the center nut, and the spiral pitch and spiral direction of the female thread to be threadedly engaged by the keep bolt are made intentionally different from those of the male thread to be threadedly engaged by the center nut, so that the anxiety of the center nut being loosened is eliminated by the simple arrangement additionally using only a single keep bolt; therein lies the technical significance of the present invention.

A second object of the present invention is to provide an arrangement wherein the center shaft portion of the adapter is hollowed, the hollow portion being formed with a male thread, the latter being threadedly engaged by a small-sized center nut through a collar adapted to engage the boss portion of a wheel disk, said center shaft portion being centrally formed with a female thread of fixed depth, said female thread being threadedly engaged by a keep bolt having a large-sized head which prevents the loosening of the center nut, thereby increasing the durability and safety of the wheel fixed in position, while preventing the center of the wheel disk from being visually hidden by the center nut, and increasing the degree of freedom in giving various molding patterns for ventilation purposes to the wheel disk so as to cause, for example, the spokes which are supports for the wheel rim to look to be as long as possible.

A third object of the present invention is to provide an arrangement wherein the large-diametered head of said keep bolt is formed with a wheel-steal preventing notch adapted to be engaged by only an exclusive turning tool, so that said keep bolt cannot be turned by a commercially available commonplace spanner, wrench or other turning tool, thereby preventing the center nut from being extracted and hence preventing the stealing of the wheel, the arrangement required therefore being simple; therein lies the particular significance of the invention.

Other objects of the present invention will become apparent from the detailed description of preferred embodiments of the invention to be given below.

BRIEF DESCRIPTION OF THE DRAWINGS

FIGS. 1 through 7 show a basic embodiment of the invention.

FIGS. 8 and 9 show a first modified embodiment of the present invention, FIG. 8 being a fragmentary enlarged view corresponding to FIG. 2;

FIGS. 10 through 13 show a second modified embodiment of the present invention, FIG. 10 being an entire schematic front view corresponding to FIG. 1;

DETAILED DESCRIPTION OF THE PREFERRED EMBODIMENTS

The concrete arrangement of the present invention will now be described in detail with reference to the accompanying drawings. In FIGS. 1 through 7 showing a basic embodiment of the invention, the character D denotes a wheel disk of light alloy metal, having at its center a relatively large shaft hole 11. The numerals 12 and 13 denote a plurality of torque pin receiving female threads and a plurality of hub nut clearing recesses, respectively, which are formed on the rear surface of the boss 10 (the attaching surface of the wheel disk) and positioned around the shaft hole 11, and in each case, they are radially symmetrically distributed as a whole, alternating with each other.

Figure 2:
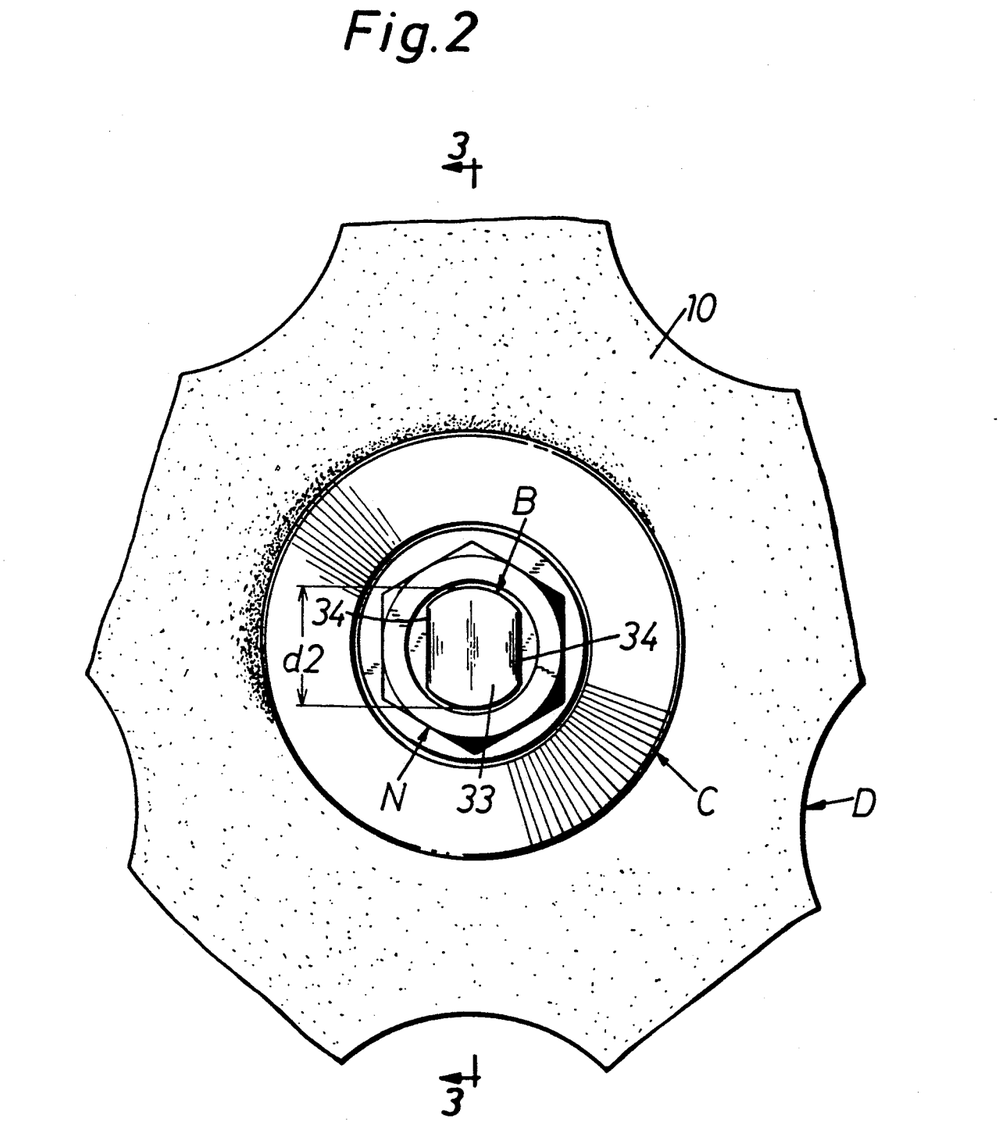
FIG. 2 is a fragmentary front view showing the boss of a wheel disk in an enlarged scale.
Figure 3:
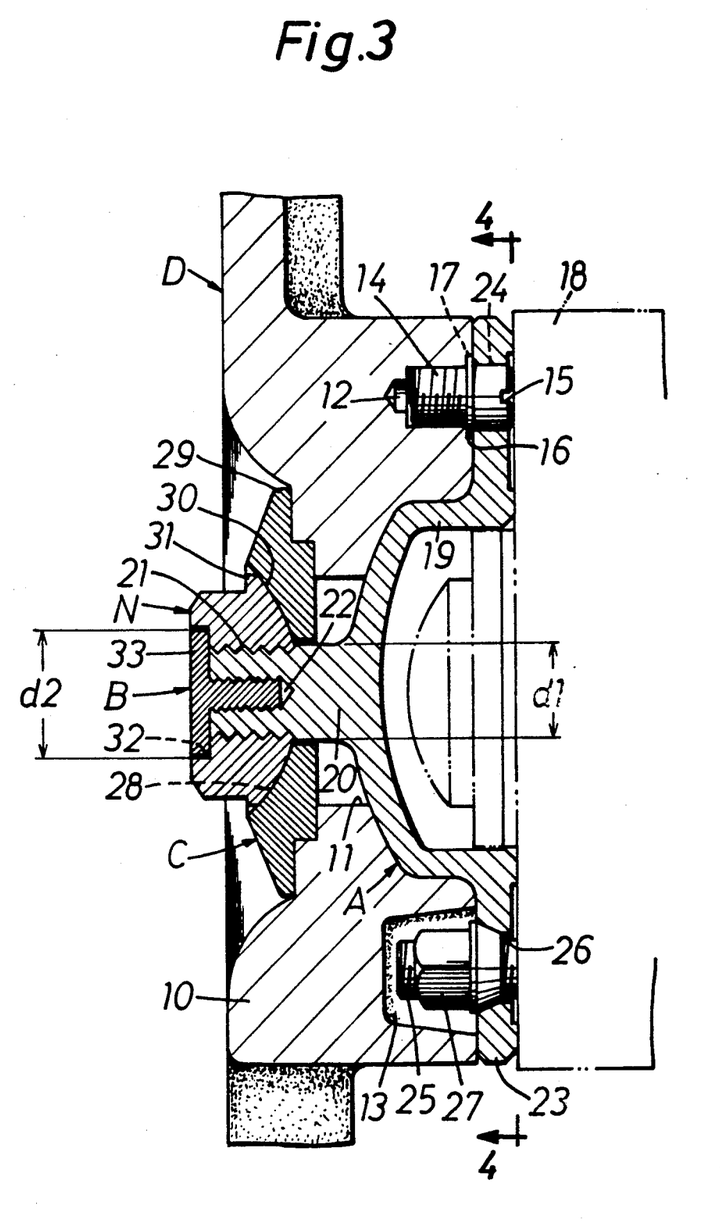
FIG. 3 is a sectional view taken along the line 3—3 in FIG. 2.
Figure 4:
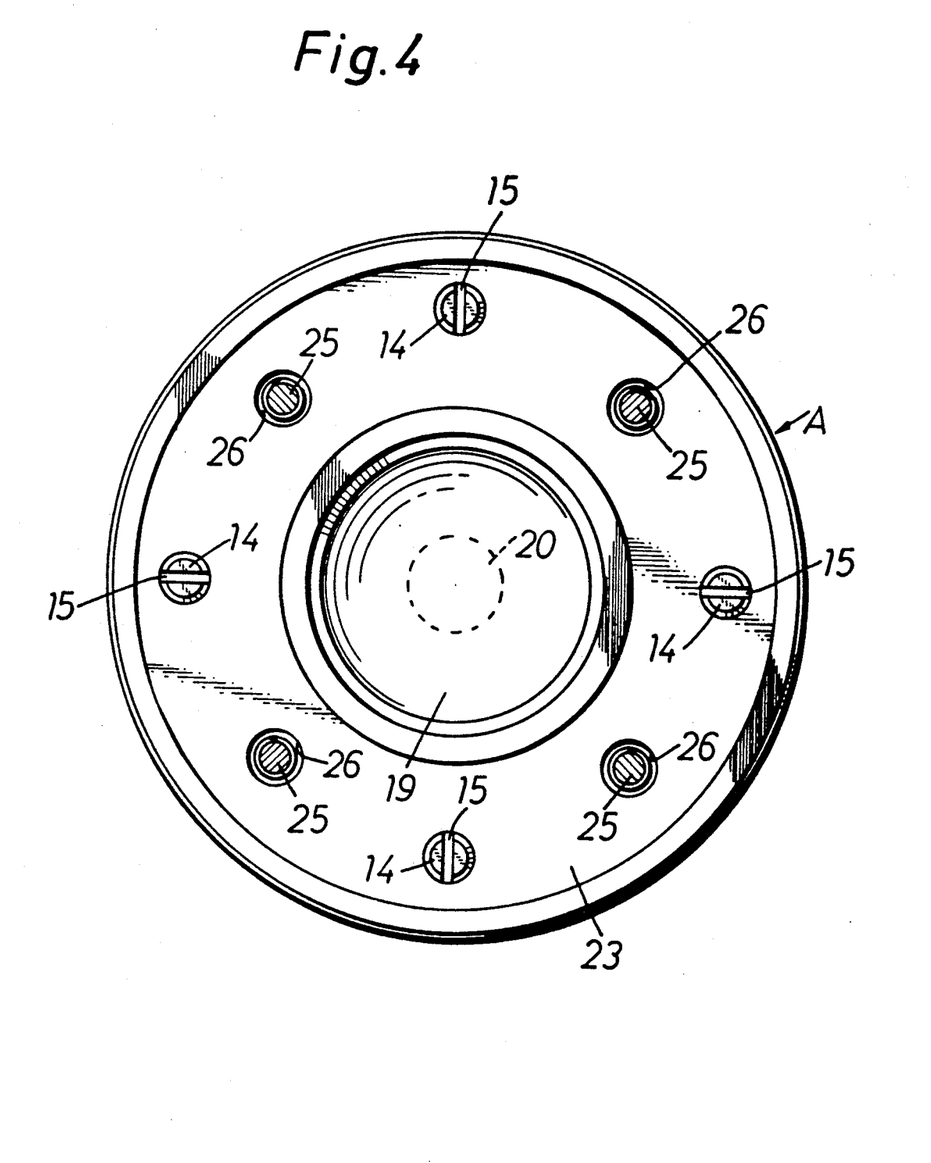
FIG. 4 is a sectional view taken along the line 4—4 in FIG. 3.

The numeral 14 denote torque pins threadedly engaged with said female threads 12 of said wheel disk D in a stud bolt fashion, rearwardly projecting a fixed distance from the rear surface of the boss 10. The numeral 15 denotes turning tool engaging notches formed in the rear ends of the torque pins, each torque pin 14 being threadedly engaged with said female thread 12 by a turning tool (not shown) applied thereto. The numeral 16 denotes a stopper flange projecting with a somewhat large diameter from an intermediate portion of each torque pin, adapted to engage a recessed surface 17 notched in the opening edge of said female thread, thereby controlling the amount by which the torque pin projects when it is set and preventing the play of the torque pin 14 itself.

The character A denotes a separate adapter for attaching the boss 10 of said wheel disk D to an axle hub 18, said adapter being made of iron or light alloy and shaped by forging or other plastic working into a top hat form or cylinder hat form.

Figure 5:
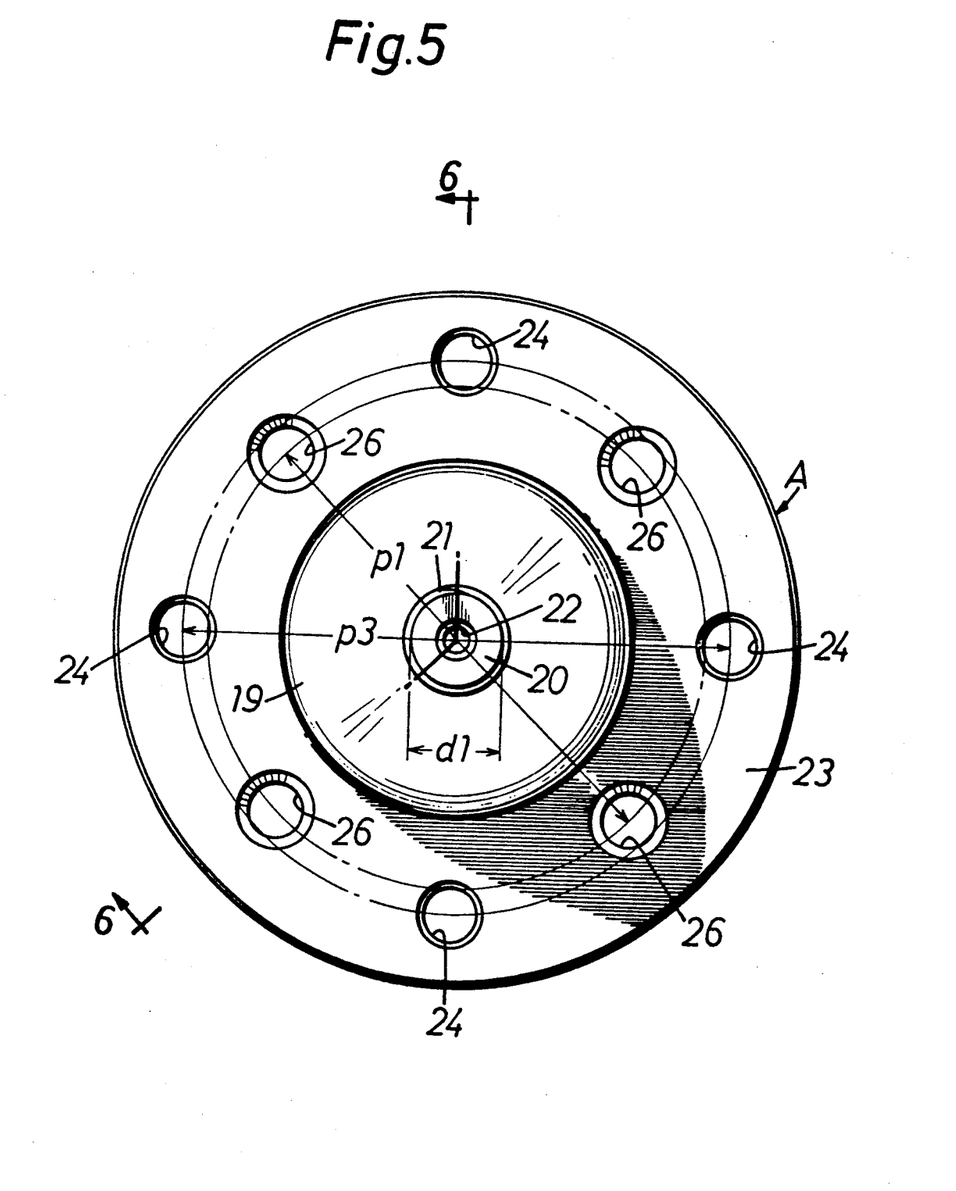
FIG. 5 is a front view showing an adapter.
Figure 6:
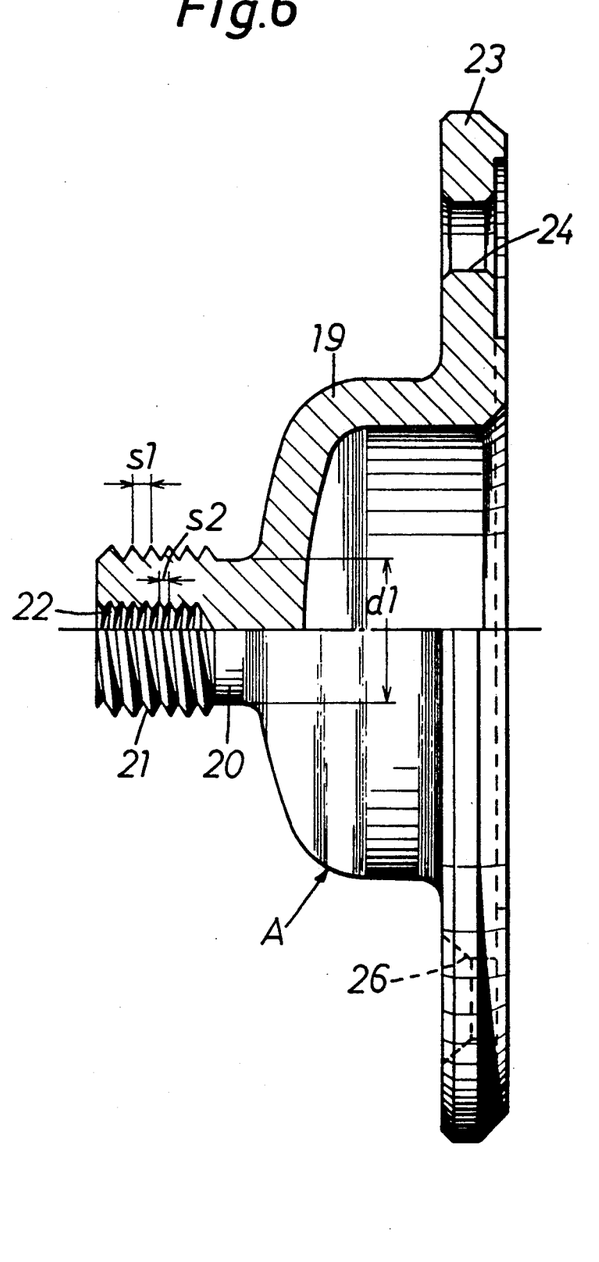
FIG. 6 is an enlarged view half in section taken along the line 6—6 in FIG. 5.

That is, in FIGS. 5 and 6 showing it detached, the numeral 19 denotes the substantially conical barrel of the adapter A, having a size allowing it to sink in the shaft hole 11 of the wheel disk D. The numeral 20 denotes a solid center shaft portion integrally projecting forwardly from the center (top surface) of the barrel 19 and having a diameter d1 smaller than that of the barrel 19 and formed at the circumferential surface thereof with a male thread 21 for receiving a center nut to be later described and at the center thereof with a female thread 22 of fixed depth for receiving a keep bolt to be later described.

In that case, the male thread 21 and the female thread 22 of the center shaft portion 20 have their spiral pitches s1 and s2 and spiral directions respectively made different, so that in the state of use where a center nut to be later described is held by the keep bolt, it is locked so that it cannot be easily concomitantly turned for loosening.

In this point, in the illustrated embodiment, the spiral direction of said male thread 21 is clockwise and its spiral pitch s1 is relatively long, while the spiral direction of the female thread 22 is counterclockwise and its spiral pitch s2 is relatively short. However, so long as said purport can be achieved, the relations between the female and male threads 22 and 21 may be made opposite as to the spiral pitches s1 and s2 and the spiral directions.

Further, the numeral 23 denotes a large-diametered joint flange integrally extending from the proximal end of the barrel 19 of the adapter A, said joint flange being formed with a plurality of torque pin receiving holes 24 in a radially symmetrically distributed pattern corresponding to the torque pins 14 projecting from the boss 10 of the wheel disk D.

The numeral 25 denotes a plurality of stud bolts integrally extending forwardly from the hub 18 of said axle, and stud bolt receiving holes 26 for receiving them are formed in the joint flange 23 of the adapter A distributively and alternately with torque pin receiving holes 24. After all of the stud receiving holes 26 of the adapter A have been loosely fitted on the stud bolts 25, hub nuts 27 are threadedly engaged with the stud bolts 25 from the front, whereby the adapter A is primarily fixed to the hub 18 of the axle. Secondarily, the torque pins 14 are force-fitted into the torque receiving holes 24 of the adapter A from the front, whereby the wheel disk D is integrally attached to the adapter A.

At any rate, the hub nuts 27 are clearingly received respectively in the recesses 13 of the wheel disk D, with no possibility of the hub nuts interfering with the boss 10 of the wheel disk D.

Further, the stud bolt receiving holes 26 distributively formed in the joint flange 23 of the adapter A are in conical form snugly fitted to the conical surfaces of the hub nuts 27; thus, automatic centering action is developed when the hub nuts 27 are threadedly engaged with the stud bolts 25.

Figure 7:
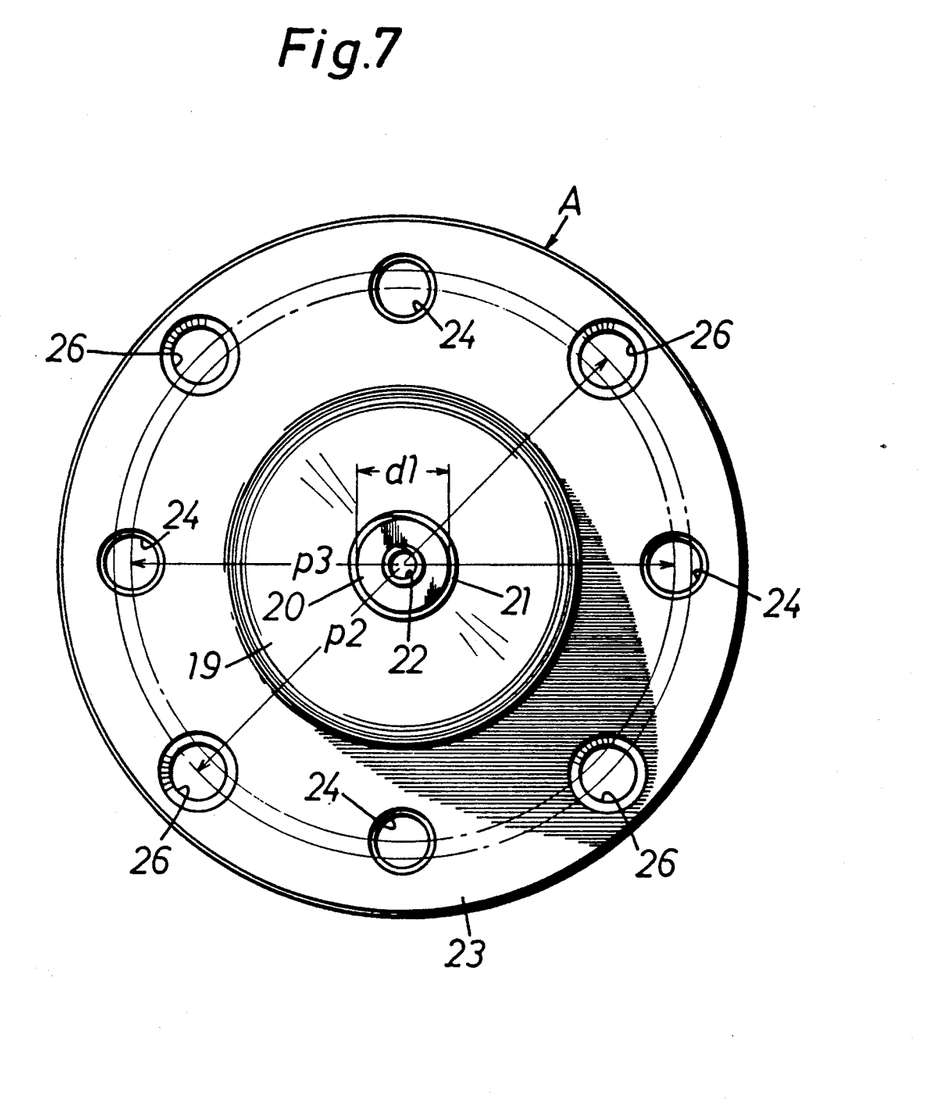
FIG. 7 is a front view showing another adapter which can be used interchangeably with the one shown in FIG. 5.

In that case, as suggested from a comparison between FIGS. 5 and 7, it is preferable that an adapter A in which said stud bolt receiving holes 26 are distributively formed as having a small PCD (pitch circle diameter) p1 and another adapter A in which said stud bolt receiving holes 26 are distributively formed as having a relatively large PCD p2 be prepared in advance and that these adapters be selectively used to attach the wheel disk D to the hub 18 of the axle. In that case, it goes without saying that the torque pin receiving holes 24 are distributively formed as having the same PCD p3 common with said different adapters.

By so doing, even if the PCD p1 and p2 of said stud bolts 25 differ from one automobile maker to another or from one automobile type to another, there is no need to prepare and keep in stock different types of wheels corresponding thereto. Thus, by changing the adapter A alone, the particular wheel disk D can be attached to the hub 18 of the axle without any trouble, a fact which is advantageous from the standpoint of interchangeability.

Figure 1:
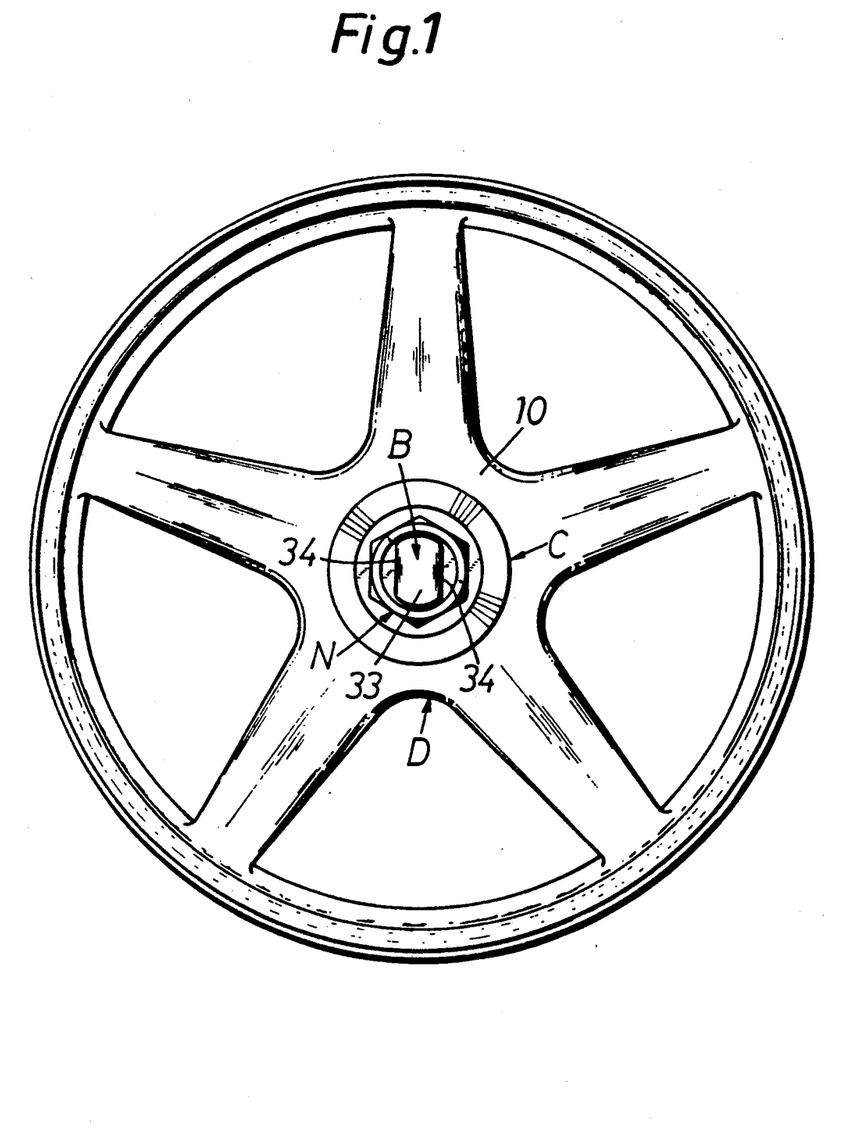
FIG. 1 is a schematic front view of the whole of an automobile wheel.

Further, the character C in FIGS. 1 through 3 denotes a keep collar loosely fitted to the center shaft portion 20 from the front, said keep collar being made of light alloy in a disk form which is large enough to close the shaft hole 11 of the wheel disk D. The numeral 28 denotes a conical concave surface formed in the center of the front surface of the keep collar C, providing a centering action on the center nut to be later described. The numeral 29 denotes an engaging shoulder surface formed on the peripheral edge of the keep collar C.

The character N denotes a relatively small-diametered center nut threadedly engaged with the male thread 21 of the center shaft portion in the adapter A so as to press the keep collar C from the front to thereby fix it in position. A flange 31 having a conical convex surface 30 fitted to the conical concave surface 28 of the keep collar C projects from the rear end of said center nut N, while the front end of the center nut N is formed with a keep bolt receiving concave surface 32 to be later described.

The character B denotes a keep bolt for the center nut N whose head 33 has a diameter d2 greater than that of the center shaft portion 20 of the adapter A. When it is threadedly engaged with the female thread 22 of the center shaft portion 20 from the front, the large-diametered head 33 of the keep bolt B engages the concave surface 32 of the center nut N as it sinks onto said concave surface, thereby locking the center nut N from the front to prevent it from loosening.

In that case, the large-diametered head 33 of the keep bolt B is formed with steal-preventive notches 34 for receiving a special turning tool. Therefore, unless the notches are engaged by a special order-made turning tool (not shown), the keep bolt B cannot be turned and hence the center nut N cannot be extracted from the center shaft portion 20 of the adapter A; thus, the stealing of the wheel is prevented. It is arranged that commercially available spanners, wrenches or other turning tools cannot be applied to the tool receiving notches 34 of the keep bolt B.

In the illustrated embodiment, the tool receiving notches 34 are in the form of a pair of opposed flat straight surfaces formed by cutting away portions of circumferential surface of the head 33 of the keep bolt B; however, so long as the above purport can be attained, an oval groove may be formed in the center of the head 33.

Figure 8:
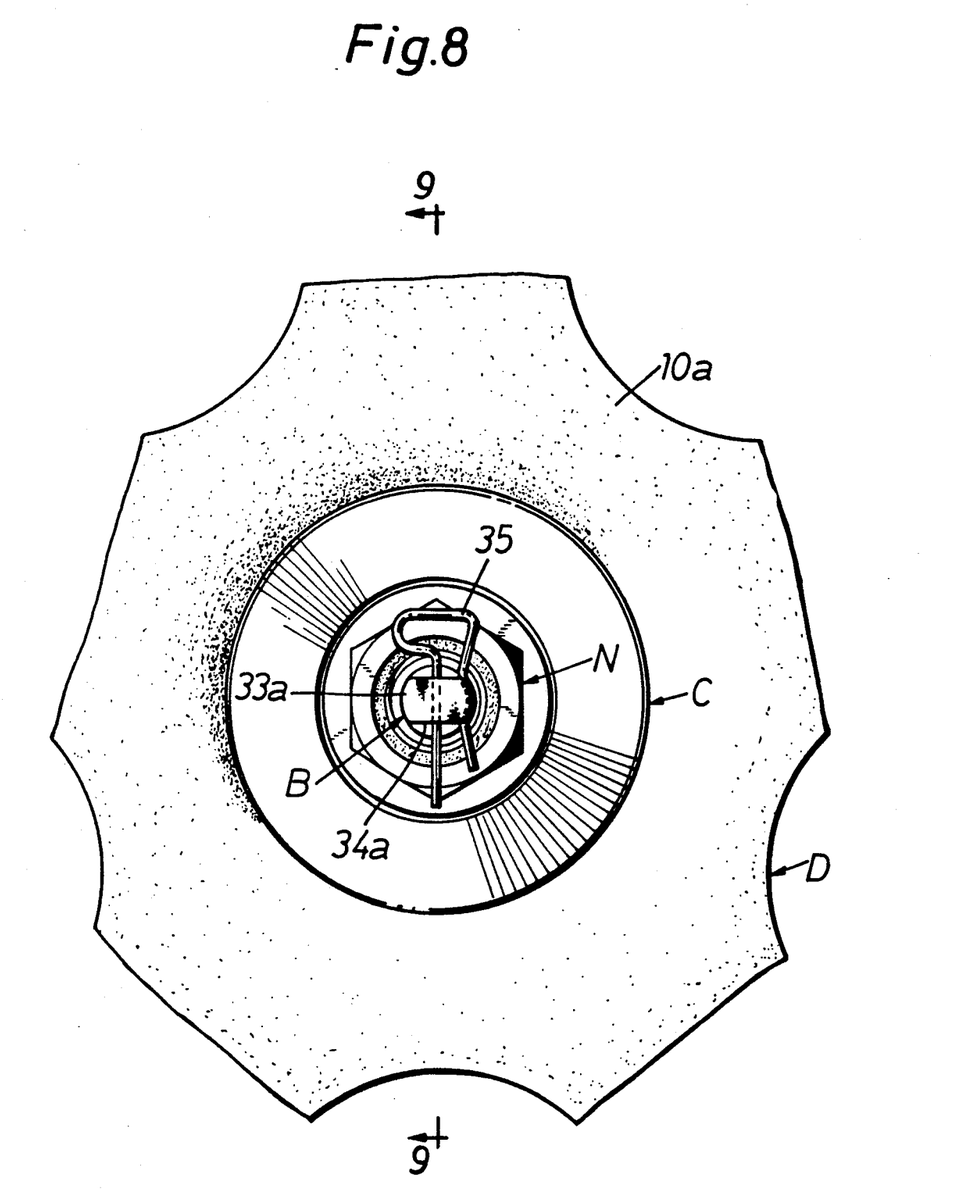
Figure 9:
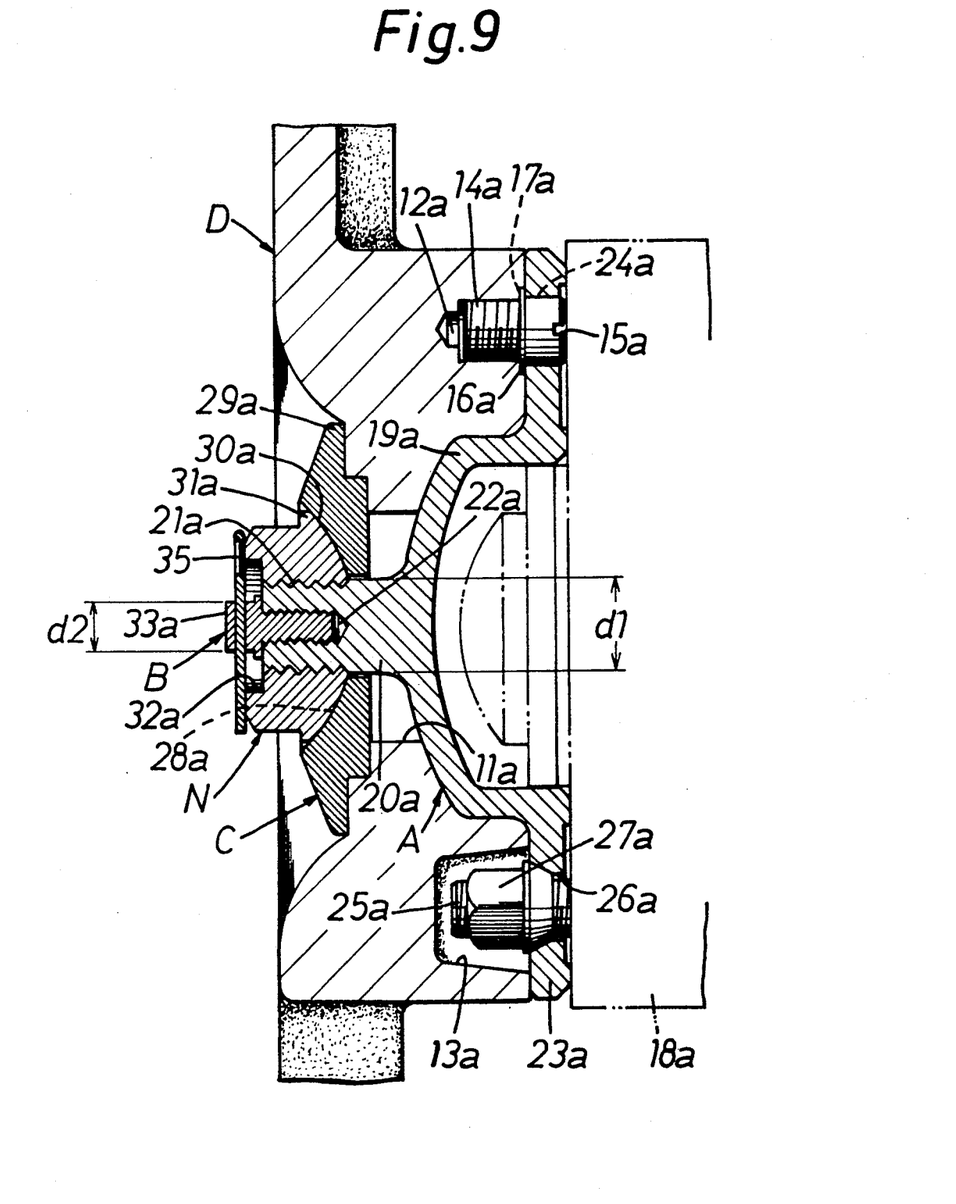
FIG. 9 is a sectional view taken along the line 9—9 in FIG. 8.
Figure 10:
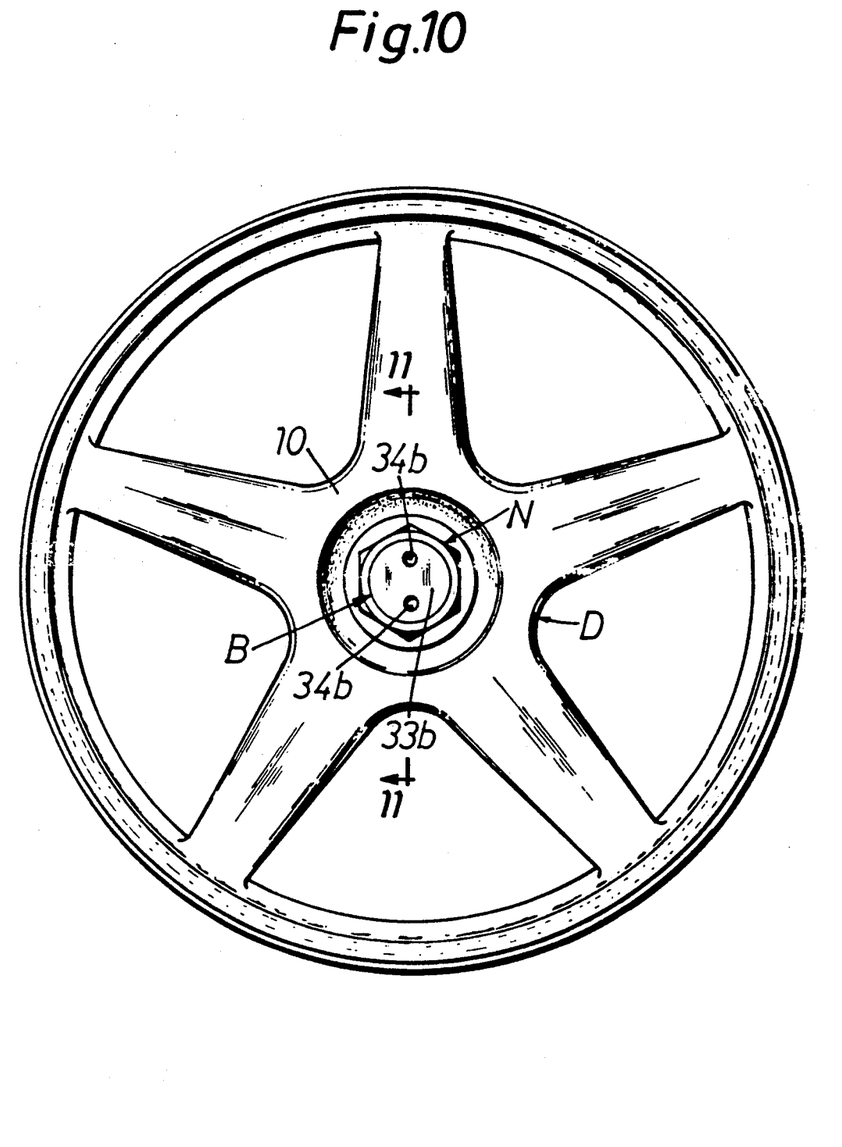

However, if and only if the present invention is used for racing cars, as is clear from the first modified embodiment shown in FIGS. 8 and 9, in order to make it possible to exchange wheels as soon as possible, a keep bolt B having a head 33a with a smaller diameter than that of the center shaft portion 20a of the adapter A is substituted for said keep bolt B having said large-diametered head 33 and is threadedly engaged with the female thread 22a of the center shaft portion 20a and a beta pin 35 is removably inserted into the small-diametered head 33a of the keep bolt B, thereby holding the center nut N from the front to prevent it from loosening.

By so doing, the center nut N can be extracted from the center shaft portion 20a simply by extracting the beta pin 35 even if the operator does not extract the keep bolt B from the center shaft portion 20a; thus, for racing cars, the wheels can be quickly exchanged.

In addition, the rest of the arrangement in the first modified embodiment shown in FIGS. 8 and 9 is the same as in the basic embodiment shown in FIGS. 1 through 7. Therefore, corresponding characters prepared by adding the letter "a" to the reference numerals used in the basic embodiment are entered in FIGS. 8 and 9, and a detailed description thereof is omitted.

FIGS. 10 through 13 show a second modified embodiment of the present invention, wherein the barrel 19b of an adapter A is frusto-conical, forwardly extending in a hollow cylindrical form smoothly continuous with a center shaft portion 20b, with a female thread 22b cut in the inner peripheral surface thereof. The keep bolt B is formed relatively large in size so that it can ornamentally close the front end of the opening in the center shaft portion 20b from the front.

Figure 11:
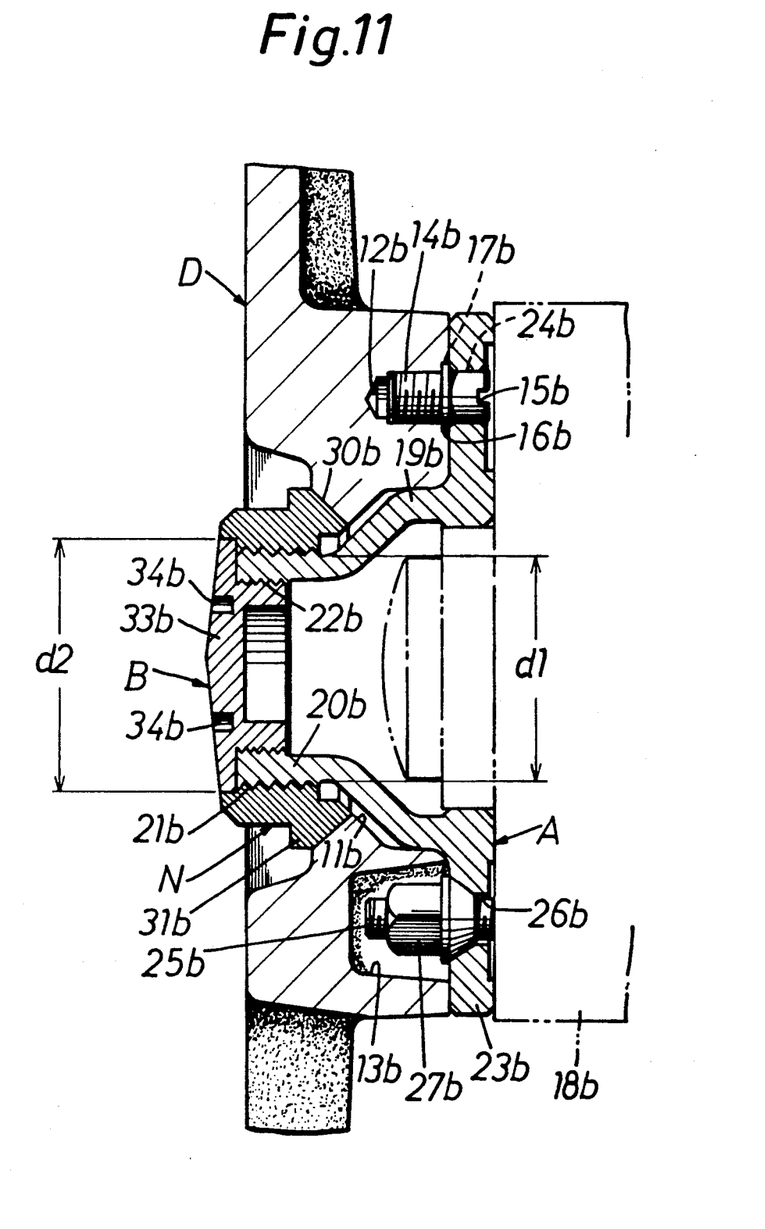
FIG. 11 is an enlarged sectional view taken along the line 11—11 in FIG. 10.
Figure 12:
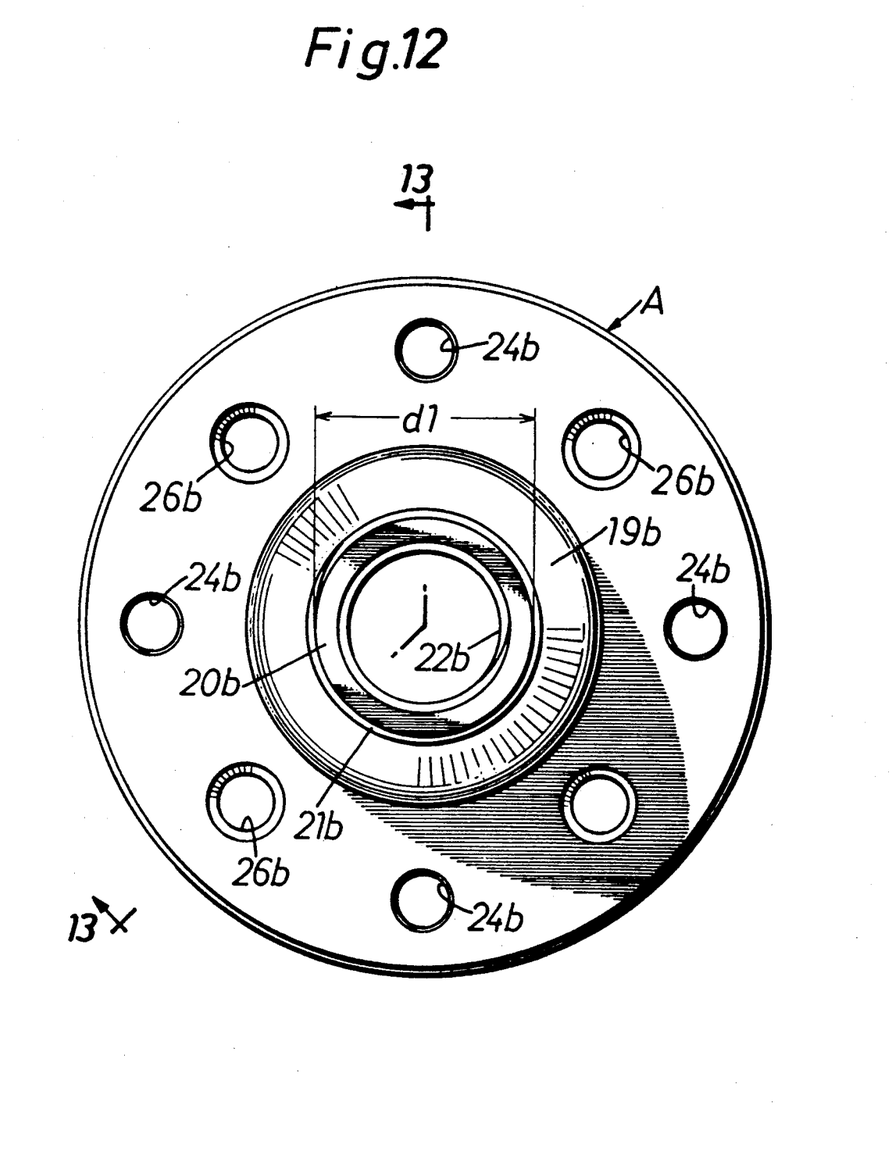
FIG. 12 is a front view of an adapter extracted from FIG. 11.

In the second modified embodiment, the separate collar C in the basic embodiment is omitted and instead a center nut N is a large-sized part including the function of such keep collar is directly engaged with the boss 10b of a wheel disk D. In addition, the flange 31b of the center nut N has a conical convex surface 30b fitted to the conical concave surface notched in the opening edge of the shaft hole 11b of the wheel disk D.

Figure 13:
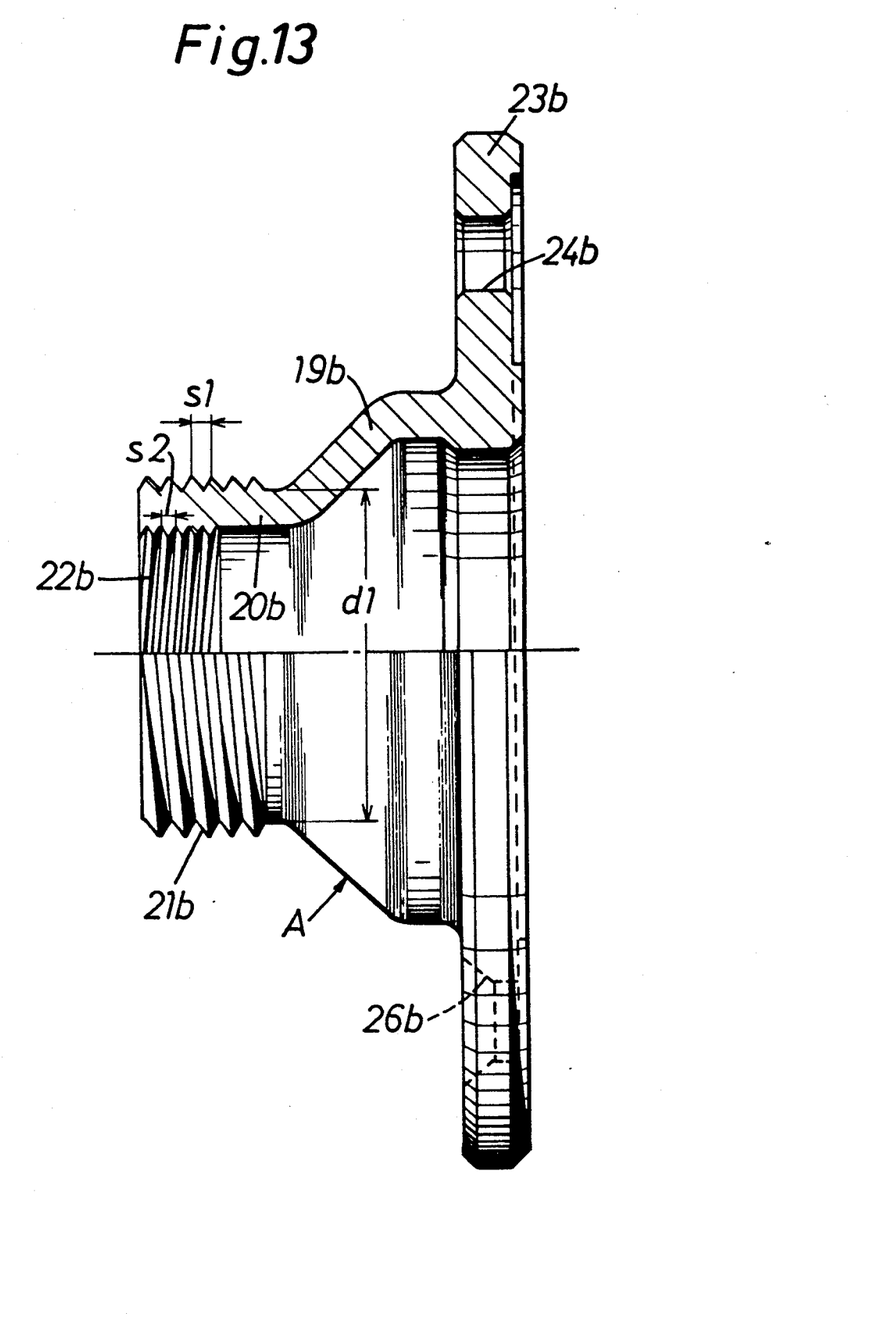
FIG. 13 is a fragmentary enlarged view half in section taken along the line 13—13 in FIG. 12.

In the case of the second modified embodiment, special tool receiving notches 34b in the form of a pair of round grooves are formed in the large-diametered head 33b of the keep bolt B.

In addition, the rest of the arrangement is the same as in the basic embodiment shown in FIGS. 1 through 7. Therefore, corresponding characters prepared by adding the letter "b" to the reference numerals used in the basic embodiment are entered in FIGS. 10 through 13, and a detailed description thereof is omitted.

The operation of attaching the wheel disk D to the hub 18 of the axle will now be described on the basis of the basic embodiment shown in FIGS. 1 through 7. First, the operator superposes the joint flange 23 of the adapter A on the hub 18 of the axle while inserting the stud bolts 25 set in the hub 18 into the stud bolt receiving holes 26 of adapter A, and applies the hub nuts 27 to the stud bolts 25 from the front, thereby fixing the adapter A to the hub 18 of the axle.

Then, with the torque pins 14 force-fitted in the torque pin receiving holes 24 of the adapter A, he fits the boss 10 of the wheel disk D on the barrel 19 of the adapter A and applies the keep collar C to the center shaft portion 20 projecting from the center (top surface) of the barrel 19.

And he threadedly engages the center nut N with the male thread 21 of the center shaft portion 20 to press the keep collar C by the center nut N. Finally, he threadedly engages the keep bolt B with the female thread 22 of the center shaft portion 20 to lock the center nut N from the front by the large-diametered head 33 of the keep bolt B to prevent it from loosening.

Thus, the torque from the hub 18 is smoothly transmitted primarily from the stud bolts 25 and hub nuts 27 to the adapter A and secondarily through the torque pins 14 to the wheel disk D, whereby the wheel is smoothly rotated.

Further, with the wheel thus attached, the male threaded 21 and female thread 22 cut in the center shaft portion 20 have their pitches s1 and s2 and spiral directions made respectively different from each other and the center nut N is threadedly engaged with the male thread 21, while the keep bolt B for locking the center nut N is threadedly engaged with the female thread 22, with the result that even if the center nut N is repetitively subjected to hard brakes or other vibrations or shocks during traveling of the automobile, there is no danger of it accidentally loosening; thus, a stable strong wheel attaching state can be maintained forever.

Though omitted from illustration, a belleville spring or washer may be interposed between the front surface of the center shaft portion 20 and the head 33 of the keep bolt B.

In brief, in the present invention, in contrast to the prior art techniques, the center shaft portion 20 or 20b of the adapter A has cut therein a female thread 22 or 22b for threaded engagement with the keep bolt B, in addition to the male thread 21 or 21b for threaded engagement with the center nut N. Particularly, the spiral pitch s1 and spiral direction of the male thread 21 or 21b are made intentionally different from the spiral pitch s2 and spiral direction of the female thread 22 or 22b, while the center nut N is locked from the front by the large-diametered head 33 or 33b of the keep bolt B so that it will not loosen; thus, a stable strong wheel attaching state is obtained against hard brakes or other vibrations or shocks during traveling of the automobile. Furthermore, it is only necessary to add a single keep bolt B as the necessary part to achieve such effect, and the arrangement and assembly operation of such keep bolt are very simple. The mass-production effect can be developed to the greatest extent, and the uneasy feelings of general users can be eliminated. And attainment of such effects is not limited to the use of the basic embodiment shown in FIGS. 1 through 7; they can be attained by the use of the second modified embodiment shown in FIGS. 10 through 13, as well.

Particularly, as is clear from the basic embodiment shown in FIGS. 1 through 7, if the shaft portion 20 of the adapter A is made in the form of a relatively thin solid shaft formed at its center with a female thread 22 of fixed depth and if a relatively small center nut N is threadedly engaged with said center shaft portion 20 through a keep collar C engaged with the boss 10 of the wheel disk D, then in addition to the attainment of the effects described above, it is possible to use commonplace small-sized parts as said center nut N and keep bolt B, further promoting the mass production effect and eliminating the possibility of these parts visually hiding the center of the wheel disk D. As a result, in applying various molding patterns for ventilation purposes to the disk wheel D, there is almost no limit in design. For example, spokes which form support members for the wheel can be made to look to be as long as possible.

Further, if the large-diametered head 33 or 33b of the keep bolt B for locking the center nut N is formed with steal-preventive notches 34 or 34b which receive only an exclusive turning tool prepared as an order-made article, then it becomes very difficult to extract the keep bolts B with malicious intention, and as a result of precluding the possibility of intentionally extracting the center nuts N, the wheels are prevented from being stolen. Thus, the present invention is a useful improvement invention.

What is claimed is:

1. A center lock device for automobiles, comprising: an adapter having a conical barrel with a proximal end from which a joint flange integrally projects, said joint flange being formed with a plurality of stud bolt receiving holes and a plurality of torque pin receiving holes alternating with each other and disposed in a radially symmetrically distributive pattern, a center shaft portion integrally projecting from the conical barrel of the adapter and formed with a male thread around the outer perimeter of the center shaft portion for threaded engagement with a center nut, said adapter being attachable to a hub of an axle with the stud bolt receiving holes fitted on stud bolts on the hub and a hub nut threadedly engaged with the stud bolts, said torque pin receiving holes capable of fitting torque pins projecting from a boss of a wheel disk, said center nut being threadedly engageable with said male thread thereby fixing the wheel disk to the adapter, a female thread for receiving a keep bolt cut into the outermost distal end of the center shaft such that its spiral pitch and spiral direction differ from those of the male thread, a keep bolt having a head larger in diameter than the center shaft portion threadedly engageable with the female thread from the front to lock the center nut from the front by the large-diametered head of the keep bolt so as to prevent it from loosening, said center shaft and said conical barrel being integrally formed such that the adapter comprises a single integrally formed piece, and said center shaft comprising a relatively thin solid shaft.

2. A center lock device for automobile wheels as set forth in claim 1, wherein a keep collar for engagement with the boss of the wheel disk is fitted on the center shaft portion and said center nut is threadedly engaged with the male thread of the center shaft portion so that the keep collar is pressed from the front by the center nut, and the center shaft portion is centrally formed with said female thread of fixed depth and the center nut is locked from the front against loosening by the large-diametered head of the keep bolt threadedly engaged with the female thread.

3. A center lock device for automobile wheels as set for the in claim 1, wherein the large-diametered head of the keep bolt is formed with wheel-steal preventing notches adapted to receive a special tool, so that unless an exclusive turning tool prepared as an order-made article adapted to be fitted to the notches is applied, said keep bolt cannot be turned.

4. A center lock device for automobiles, comprising:

an adapter having a conical barrel with a proximal end from which a joint flange integrally projects, said joint flange being formed with a plurality of stud bolt receiving holes and a plurality of torque pin receiving holes alternating with each other and disposed in a radially symmetrically distributive pattern, a center shaft portion integrally projecting from the conical barrel of the adapter and formed with a male thread around the outer perimeter of the center shaft portion for threaded engagement with a center nut, said adapter being attachable to a hub of an axle with the stud bolt receiving holes fitted on stud bolts on the hub and a hub nut threadedly engaged with the stud bolts, said torque pin receiving holes capable of fitting torque pins projecting from a boss of a wheel disk, said center nut being threadedly engageable with said male thread of the adapter from the front, thereby fixing the wheel disk to the adapter, a female thread for receiving a keep bolt cut into the outermost distal end of the center shaft such that its spiral pitch and spiral direction differ from those of the male thread, a keep bolt having a head smaller in diameter than the center shaft portion threadedly engageable with the female thread from the front to lock the center nut from the front, a removable member attachable to said keep bolt so as to extend over an outer surface of said nut so as to prevent it from loosening, said center shaft and said conical barrel being integrally formed such that the adapter comprises a single integrally formed piece, and said center shaft comprising a relatively thin solid shaft.

5. The center lock device for automobile wheels as set forth in claim 4, wherein said removable member comprises a pin which is inserted into a hole in said keep bolt.

6. The center lock device for automobile wheels as set forth in claim 5, wherein said pin comprises a beta pin.

* * * * *